United States Patent
Schemmann et al.

(10) Patent No.: US 9,014,576 B2
(45) Date of Patent: Apr. 21, 2015

(54) AUTOMATIC DUAL RECEIVER IN A MULTI-WAVELENGTH FIBER OPTIC SYSTEM

(75) Inventors: Marcel F. Schemmann, Marea Hoop (NL); Venk Mutalik, Middletown, CT (US); Long Zou, Norwalk, CT (US); Zhijian Sun, Avon, CT (US)

(73) Assignee: ARRIS Solutions, Inc., Suwanee, GA (US)

( * ) Notice: Subject to any disclaimer, the term of this patent is extended or adjusted under 35 U.S.C. 154(b) by 1092 days.

(21) Appl. No.: 11/897,246

(22) Filed: Aug. 28, 2007

(65) Prior Publication Data

US 2009/0052910 A1 Feb. 26, 2009

Related U.S. Application Data

(60) Provisional application No. 60/840,740, filed on Aug. 28, 2006.

(51) Int. Cl.
*H04B 10/69* (2013.01)
*H04B 10/67* (2013.01)

(52) U.S. Cl.
CPC ................................. *H04B 10/675* (2013.01)

(58) Field of Classification Search
USPC ........................................................ 398/66
See application file for complete search history.

(56) References Cited

U.S. PATENT DOCUMENTS

| | | | | |
|---|---|---|---|---|
| 5,430,568 | A * | 7/1995 | Little et al. | 398/81 |
| 6,070,090 | A * | 5/2000 | Feuerstein | 455/561 |
| 6,738,609 | B1 * | 5/2004 | Clifford | 455/296 |
| 2003/0002110 | A1 * | 1/2003 | Schemmann et al. | 359/154 |
| 2003/0005467 | A1 * | 1/2003 | Schemmann et al. | 725/143 |

* cited by examiner

*Primary Examiner* — Shi K Li
(74) *Attorney, Agent, or Firm* — Lori Anne D. Swanson

(57) ABSTRACT

An optical-to-electrical converter may include and/or involve a splitter to separate one or more narrowcast signals from a broadcast signal, at least one broadcast signal receiver to receive the broadcast signal separated from one or more narrowcast signals, at least one narrowcast signal receiver to receive the narrowcast signal separated from the broadcast signal, the narrowcast receiver including an attenuator and a filter, and a controller including logic to dynamically monitor and adjust the attenuator to maintain separation between the broadcast and narrowcast signals.

11 Claims, 13 Drawing Sheets

302 - photodiode
304 - impedance matcher
306 - pre-amplifier
308 - attenuator

310 - combiner
312 - photodiode
314 - impedance matcher
316 - pre-amplifier
318 - attenuator
320 - high pass filter 302 - photodiode
304 - impedance matcher
306 - pre-amplifier
308 - attenuator 310 - combiner
312 - photodiode
314 - impedance matcher
316 - pre-amplifier
318 - attenuator
320 - high pass filter

AUTOMATIC DUAL RECEIVER IN A MULTI-WAVELENGTH FIBER OPTIC SYSTEM

TECHNICAL FIELD

The present disclosure relates to optical communications.

BACKGROUND

Fiber optic communication system offer many advantages, including high data transfer rates and substantial immunity to electromagnetic interference. However, it is generally expensive to lay fiber optic cable, especially in dense metropolitan areas. This has led to increasing demands for higher data rates on existing fibers, and attempts to send light down longer stretches of fiber. Technologies for increasing the data rate of fiber optic communication include Course Wave Division Multiplexing (CWDM) and Dense Wave Division Multiplexing (DWDM).

As data rates and distance increase, limiting factors in fiber optic communications come into play. These limiting factors include Composite Second Order (CSO) and Composite Triple Beat (CTB) distortions, Cross Phase Modulation (XPM), as well as Stimulated Raman Scattering (SRS), non-linear Erbium Doped Fiber Amplifier (EDFA) response, and optical dispersion.

Many of these limiting factors are functions of optical power and optical separation (the frequency separation between communication bands in the optical signal).

Cable television optical systems may employ a broadcast signal BC (a signal intended for everyone in a particular distribution area) and several narrowcast NC signals (signals with a more targeted audience than the broadcast signal). The broadcast and narrowcast signals may be multiplexed onto a single optical fiber. Signals may be concentrated in bands around 1550 nm and 1310 nm where signal attenuation and/or dispersion tend to be at a minimum. Optical transmission power may be increased to push the signals down longer fibers, and adequate frequency separation between NC bands and between the NC and BC bands may be difficult to maintain. Consequently, the various limiting factors mentioned above, as well as others, may increasingly come into play.

SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

The optical-to-electrical converter may include and/or involve a splitter to separate one or more narrowcast signals from a broadcast signal, at least one broadcast signal receiver to receive the broadcast signal separated from one or more narrowcast signals, at least one narrowcast signal receiver to receive the narrowcast signal separated from the broadcast signal, the narrowcast receiver including an attenuator and a filter, and a controller including logic to dynamically monitor and adjust the attenuator to maintain separation between the broadcast and narrowcast signals.

The controller may include and/or involve logic to remotely receive and apply changes to a high-pass cutoff frequency of the narrowcast filter. The controller may monitor optical monitor voltage (OMV) for the broadcast receiver, and OMV for the at least one narrowcast receiver, and apply the broadcast receiver OMV and narrowcast receiver OMV to determine settings for the attenuator. The controller may also monitor an optical modulation index (OMI) for a broadcast signal transmitter, and OMI for at least one narrowcast transmitter, and apply the broadcast transmitter OMI and narrowcast transmitter OMI to determine settings for the attenuator.

In some implementations, the controller may include logic to remotely receive and apply changes to a low-pass cutoff frequency of a low-pass filter of the broadcast receiver, and/or to dynamically adjust the gain of one or both of the broadcast and narrowcast receivers.

Other system/method/apparatus aspects are described in the text (e.g., detailed description and claims) and drawings forming the present application.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Optical Communication System Employing Multiple Dual Receivers

Figure 1:
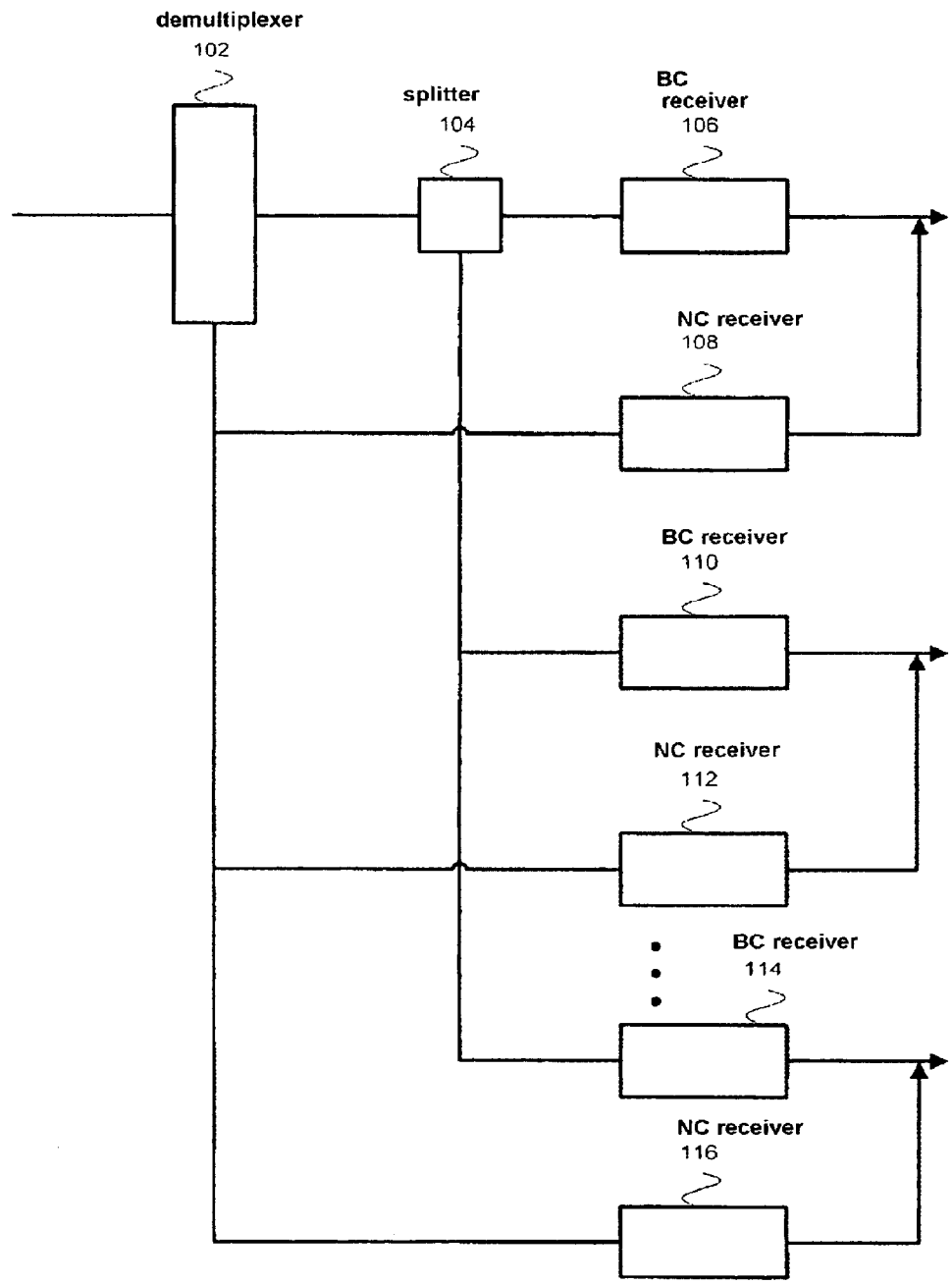
FIG. 1 is a block diagram of an embodiment of an optical communication system employing multiple dual receivers.

FIG. 1 is a block diagram of an embodiment of an optical communication system employing multiple dual receivers. The system includes, but may not be limited to, an optical de-multiplexer 102, a BC optical splitter 104, a BC optical-to-electrical RF receiver 106, a NC optical-to-electrical RF receiver 108, a BC optical-to-electrical RF receiver 110, a NC optical-to-electrical RF receiver 112, a BC optical-to-electrical RF receiver 114, and a NC optical-to-electrical RF receiver 116. Other elements and/or couplings among the elements have been omitted as they would be apparent to skilled practitioners in the relevant art(s).

The optical de-multiplexer 102 splits a multi-wavelength optical signal into multiple signals centered around different carriers. The de-multiplexer 102 may be implemented by, for example, one or more prisms or gratings. The BC optical-to-electrical RF receivers 106, 110, 114 convert broadcast optical signals to RF band electrical signals. The NC optical-to-electrical RF receivers 108, 112, 116 convert a narrowcast optical signals to RF band electrical signals.

A single BC signal may be split among the BC optical-to-electrical RF receivers 106, 110, 114, whereas each of the NC optical-to-electrical RF receivers 108, 112, 116 may be provided with a different narrowcast signal.

In the electrical domain, a BC signal may be amplified, possibly filtered, and combined with a corresponding narrowcast signal, which is also amplified and filtered in the electrical domain. Each combined BC/NC signal may be provided to specific regional area.

Other examples and/or embodiments of an optical de-multiplexer 102 and a BC optical splitter 104 may be apparent to skilled practitioners in the relevant art(s).

Optical Dual Receiver with Automatic Adjustment

Figure 2:
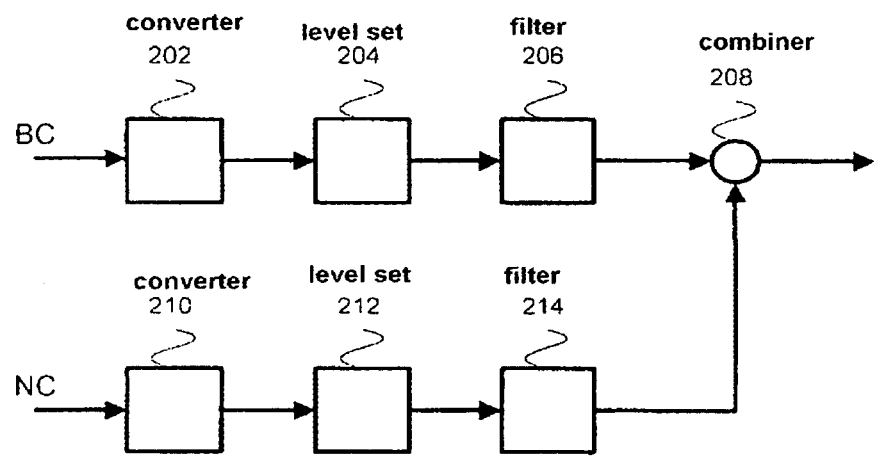
FIG. 2 is a block diagram of an embodiment of an optical dual receiver with automatic adjustment.

FIG. 2 is a block diagram of an embodiment of an optical dual receiver with automatic adjustment. The dual receiver includes, but may not be limited to, light-to-electric converters 202 210, amplification and level setting stages 204 212, filters 206 214, and a signal combiner 208. Other elements and/or couplings among the elements have been omitted as they would be apparent to skilled practitioners in the relevant art(s).

The light-to-electric converter 202 is a photodiode that receives BC modulated light from the optical fiber and outputs a corresponding modulated electrical signal; the converter may also typically include impedance matching logic to couple with the following amplification and level setting stage 204. The amplification and level setting stage 204 amplifies and sets the levels of the electrical BC signal. The filter 206 is an optional low-pass filter to provide additional control over signal separation and possibly other signal qualities, and may be implemented, for example, using low-pass filter technology known in the art.

The signal combiner 208 combines the electrical BC signal with the electrical NC signal, and may be implemented with electrical signal combining technology known in the art.

The light-to-electric converter 210 is a photodiode that receives NC modulated light from the optical fiber and outputs a corresponding modulated electrical signal; the converter 210 may include impedance matching logic to couple with the following amplification and level setting stage 212. The amplification and level setting stage 212 amplifies and sets the levels of the electrical NC signal. The filter 214 is a high-pass filter to provide control over NC/BC signal separation and possibly other signal qualities. The filter 214 may be a tunable high-pass filter.

Other examples and/or embodiments of the light-to-electric converters 202 210, amplification and level setting stages 204 212, filters 206 214, and signal combiner 208 may be apparent to skilled practitioners in the relevant art(s).

Figure 3:
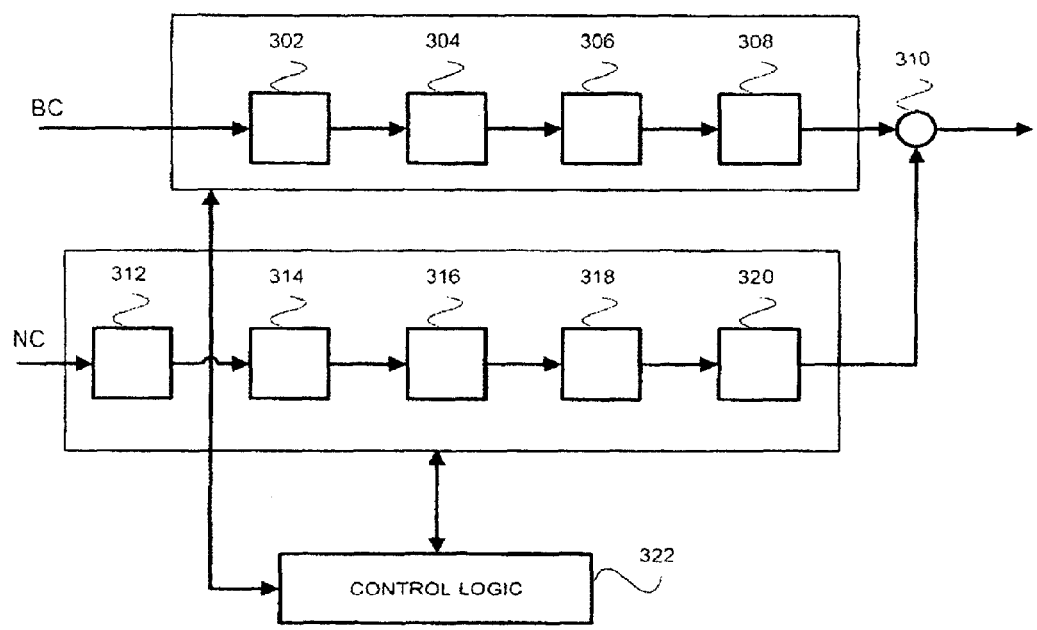
FIG. 3 is a block diagram of an embodiment of a more detailed embodiment of the optical dual receiver of FIG. 2.

FIG. 3 is a block diagram of an embodiment of a more detailed embodiment of the optical dual receiver of FIG. 2. The dual receiver includes, but may not be limited to, a BC receiver that itself comprises a photodiode 302, an impedance matcher 304, a pre-amplifier 306, and an attenuator 308. Other elements may also be present in the BC receiver. An NC receiver of the dual receiver includes a photodiode 312, an impedance matcher 314, a pre-amplifier 316, an attenuator 318, and a tunable high-pass filter 320. Other elements and/or couplings among the elements have been omitted as they would be apparent to skilled practitioners in the relevant art(s).

The dual receiver further comprises a signal combiner 310 to re-combine the BC and NC signals in the electrical domain, and control logic 322 to perform automatic adjustment and setup of the dual receiver as described herein. A post-amplifier stage (not shown) may also be present to amplify the combined electrical BC/NC signal before it is transmitted downstream.

The BC signal photodiode 302 receives BC signal-modulated light from the optical fiber and outputs a corresponding BC signal-modulated electrical signal. The BC impedance matcher 304 comprises logic to match the impedance of the photodiode to the impedance of the pre-amplifier, and may be implemented using various impedance matching technologies known in the art.

The BC pre-amplifier 306 amplifies the BC electrical RF signal, and may be implemented via RF amplifiers known in the art. The BC attenuator 308 attenuates the amplified BC electrical RF signal. The signal combiner 310 combines the amplified BC electrical RF signal with the amplified electrical NC signal, for distribution downstream in, for example, a cable television distribution plant.

The NC signal photodiode 312 receives NC signal-modulated light from the optical fiber and outputs a corresponding NC signal-modulated electrical signal. The NC impedance matcher 314 comprises logic to match the impedance of the photodiode to the impedance of the pre-amplifier, and may be implemented using impedance matching technologies known in the art.

The NC pre-amplifier 316 amplifies the NC electrical RF signal, and may have an adjustable gain in some embodiments. The NC attenuator 318 attenuates the amplified NC electrical RF signal, and may have attenuation that is adjustable to maintain frequency separation between the narrowcast and broadcast bands.

The tunable high-pass filter 320 filters the amplified NC electrical RF signal to remove signal components outside of the NC band, and may have a cutoff frequency that is adjustable according to remote settings provided to the control logic. The control logic 322 monitors OMV for the broadcast and narrowcast receivers; provides control signals to adjust narrowcast attenuation to maintain separation between broadcast and narrowcast channels; may on occasion set narrowcast high-pass filter parameters; and may in some embodiments adjust narrowcast amplification. The control logic 322 may also, in some implementations, control broadcast signal amplification; may on occasion set broadcast low-pass filter parameters; and, in general, provides control signals and processing to provide automatic setup and adjustment of the dual receiver as described herein.

Other examples and/or embodiments of light receivers 302 and 312, impedance matchers 304 and 314, RF pre-amplifiers 306 and 316, and combiner 310 may be apparent to skilled practitioners in the relevant art(s).

Automatic Adjustment to Maintain Broadcast and Narrowcast Separation

In general, an optical de-multiplexer (splitter) may be employed to separate one or more narrowcast signals from a broadcast signal. At least one broadcast signal receiver receives the broadcast signal, and at least one narrowcast signal receiver receives the narrowcast signals. The narrowcast receiver may include an attenuator and a filter, and an associated controller may include logic to dynamically monitor and adjust the attenuator to maintain separation between the broadcast and narrowcast signals. The controller may include logic to monitor optical monitor voltage (OMV) for the broadcast receiver, and OMV for the at least one narrowcast receiver, and to apply the broadcast receiver OMV and narrowcast receiver OMV to determine settings for the attenuator. The controller including logic to monitor optical modulation index (OMI) for a broadcast signal transmitter, and OMI for at least one narrowcast transmitter, and to apply the broadcast transmitter OMI and narrowcast transmitter OMI to determine settings for the attenuator.

The controller may include logic to remotely receive and apply changes to a high-pass cutoff frequency of the narrowcast filter.

In some implementations, the controller may include logic to remotely receive and apply changes to a low-pass cutoff frequency of a low-pass filter (not shown) of the broadcast receiver.

In some implementations, the controller may include logic to dynamically adjust the gain of one or both of the broadcast and narrowcast receivers, in addition to or alternatively to adjusting the attenuation.

One embodiment of a control process to maintain signal separation may proceed as follows:

1. Measure and record OMV (optical monitor voltage) of both the BC and NC receivers. OMV may provide a good proxy for the photodiode current of each of the BC and NC photodiodes. The photodiode current is proportional to the input optical power times the responsivity of the photodiode.
2. Measure and record the OMI (optical modulation index) per channel of each of the optical transmitters (BC and NC). OMI is an indication of the percentage of the available laser current modulated by each RF signal.
3. The RF output per channel is proportional to the OMV*OMI in linear units. It is further proportional to the RF gain of each individual receiver. In linear units therefore, RF output level is proportional to OMV*OMI*RF Gain
   a. RF Output of the BC is OMV BC*OMI BC*RF Gain BC
   b. RF Output of the NC is OMV NC*OMI NC*RF Gain NC
4. To maintain a constant RF ratio between BC and NC,
   a. (OMVNC*OMINC*RFGainNC)= (OMVBC*OMIBC*RFGainBC)/(RFRatio)
   b. The RF gain of the NC receiver therefore could be solved as (RFGainNC)= (OMVBC*OMIBC*RFGainBC)/ (RFRatio*OMVNC*OMINC)
5. This value of the RFGainNC could be calculated and effected by any means such as a microprocessor controlled RF PIN attenuator circuit.

Frequency Response of a Tunable Filter Versus a Fixed Filter

Figure 4:
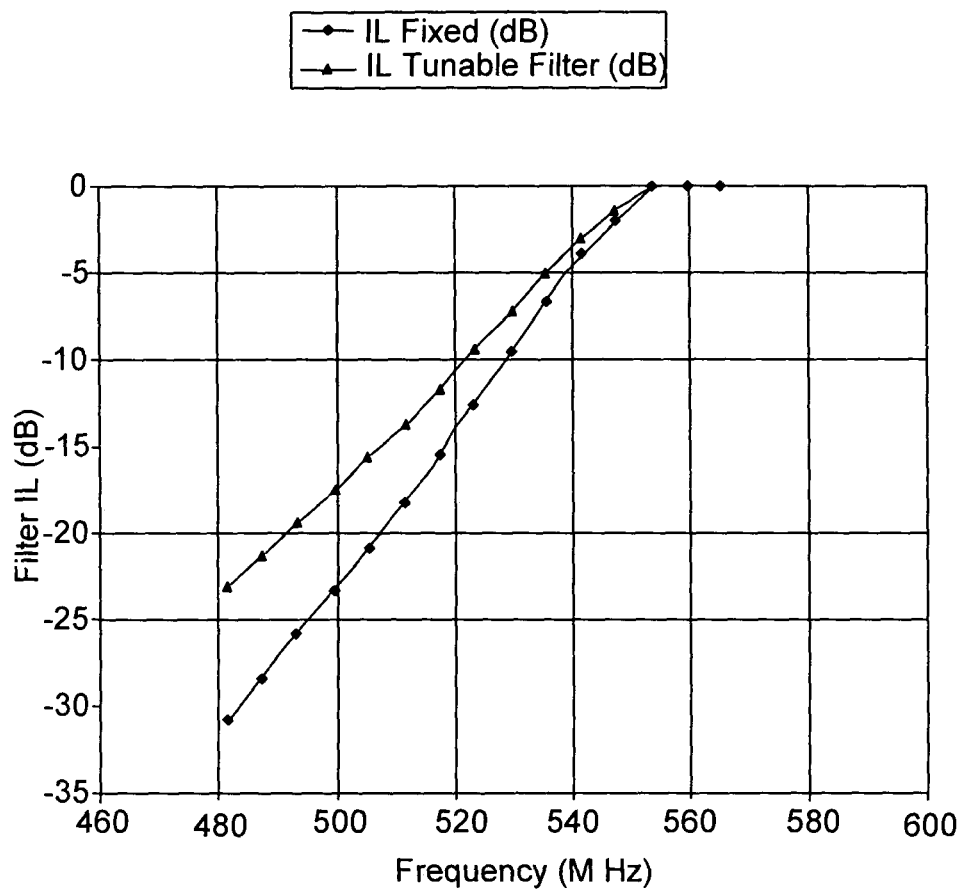
FIG. 4 is an illustration of an embodiment of a frequency response of a tunable filter versus a fixed filter.

FIG. 4 is an illustration of an embodiment of a frequency response of a tunable filter versus a fixed filter. The filter is a high pass filter that may be employed in narrowcast receivers as described herein.

Carrier to Noise Ratio as a Function of Tunable Filter Response

Figure 5:
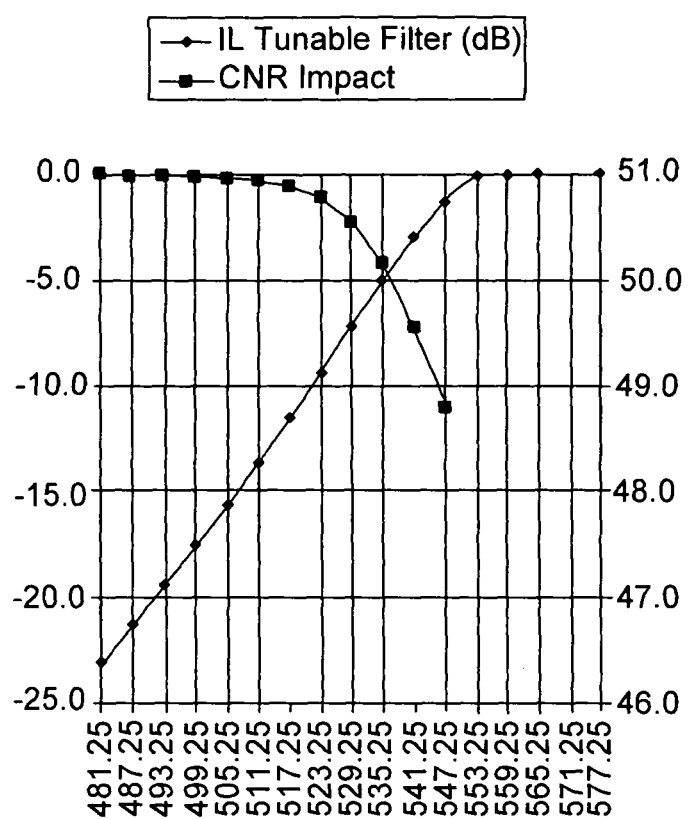
FIG. 5 is an illustration of an embodiment of a carrier to noise ratio as a function of tunable filter response.

FIG. 5 is an illustration of an embodiment of a carrier to noise ratio as a function of tunable filter response. The filter is a high pass filter that may be employed in narrowcast receivers as described herein.

Crosstalk Response in a CWDM System

Figure 6:
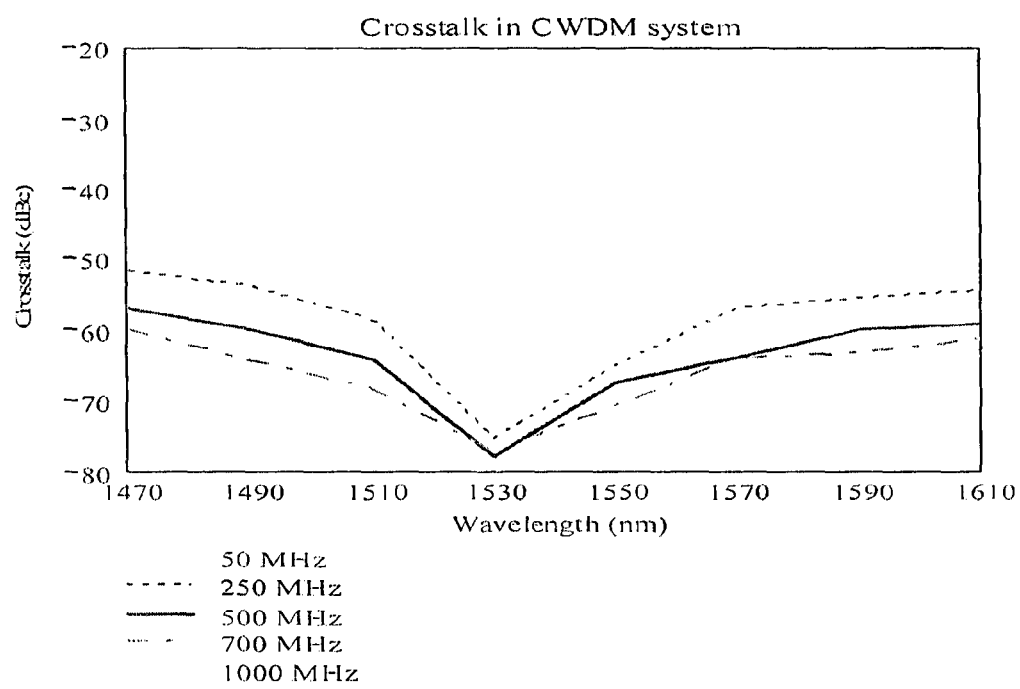
FIG. 6 is an illustration of an embodiment of a crosstalk response in a CWDM system for various carrier frequencies and using light with wavelengths in the range of 1470 to 1610 nm (8 wavelength system, 3 dBm, 30 Km).

FIG. 6 is an illustration of an embodiment of a crosstalk response in a CWDM system for various carrier frequencies and using light with wavelengths in the range of 1470 to 1610 nm (8 wavelength system, 3 dBm, 30 Km).

Figure 7:
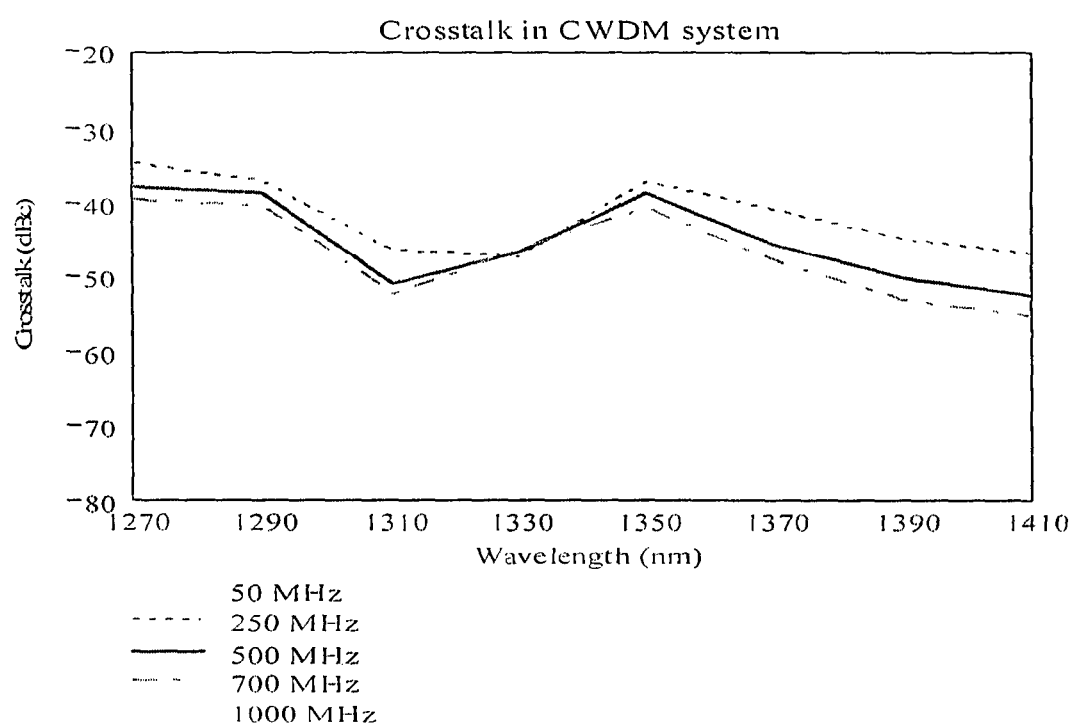
FIG. 7 is an illustration of an embodiment of a crosstalk response in a CWDM system for various carrier frequencies and using light with wavelengths in the range of 1270 to 1410 nm (8 wavelength system, 3 dBm, 30 Km).

FIG. 7 is an illustration of an embodiment of a crosstalk response in a CWDM system for various carrier frequencies and using light with wavelengths in the range of 1270 to 1410 nm (8 wavelength system, 3 dBm, 30 Km).

Figure 8:
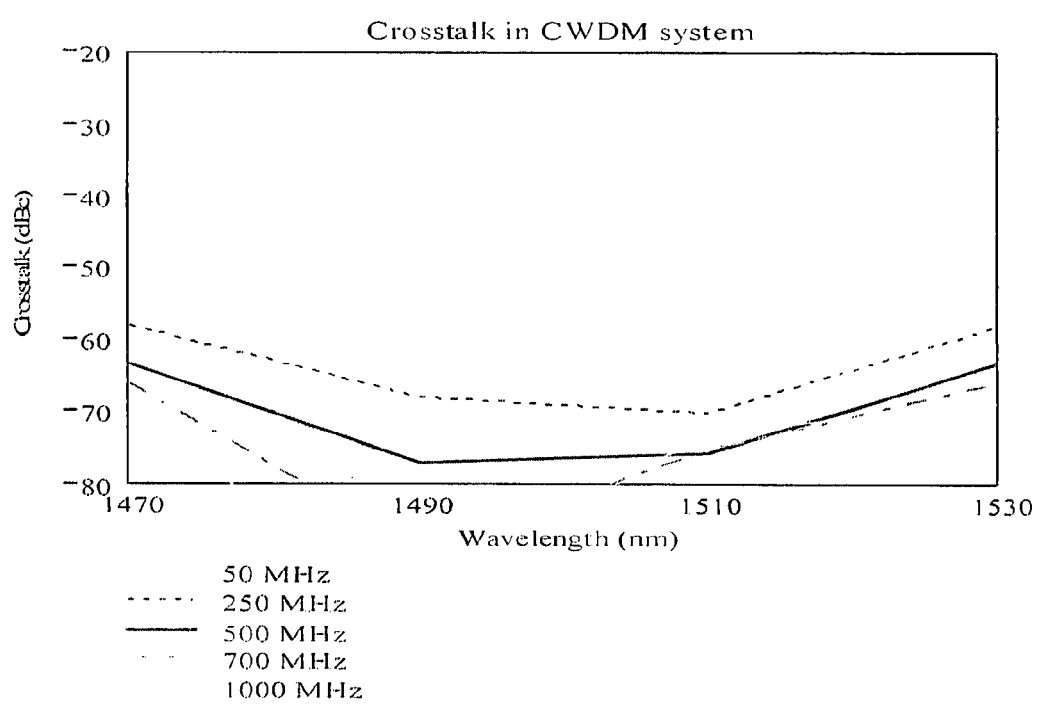
FIG. 8 is an illustration of an embodiment of a crosstalk response in a CWDM system for various carrier frequencies and using light with wavelengths in the range of 1470 to 1530 nm (4 wavelength system, 3 dBm, 30 Km).

FIG. 8 is an illustration of an embodiment of a crosstalk response in a CWDM system for various carrier frequencies and using light with wavelengths in the range of 1470 to 1530 nm (4 wavelength system, 3 dBm, 30 Km).

Figure 9:
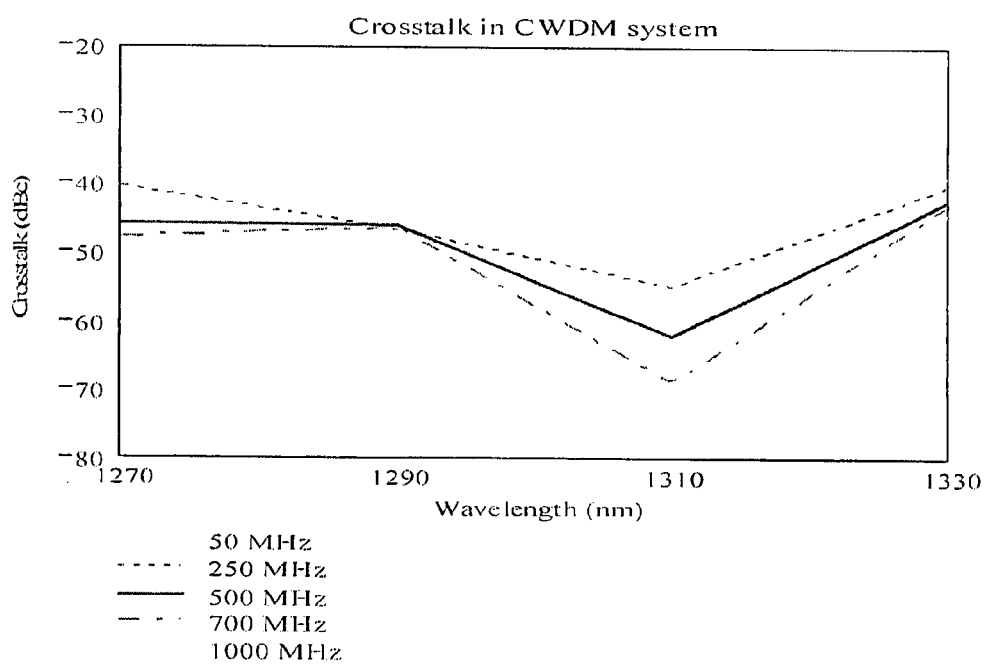
FIG. 9 is an illustration of an embodiment of a crosstalk response in a CWDM system for various carrier frequencies and using light with wavelengths in the range of 1270 to 1330 nm (4 wavelength system, 3 dBm, 30 Km).

FIG. 9 is an illustration of an embodiment of a crosstalk response in a CWDM system for various carrier frequencies and using light with wavelengths in the range of 1270 to 1330 nm (4 wavelength system, 3 dBm, 30 Km).

Figure 10:
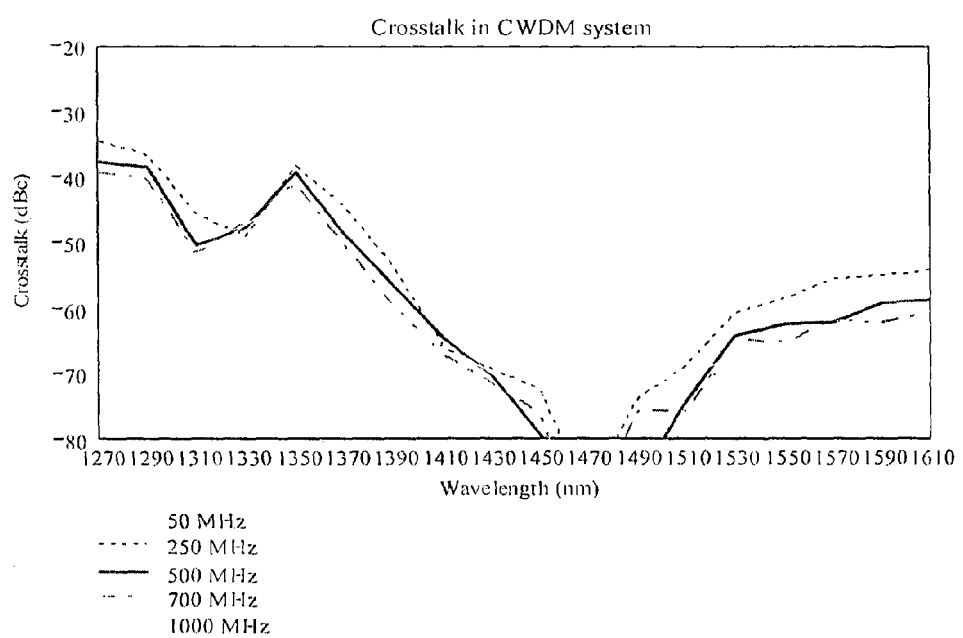
FIG. 10 is an illustration of an embodiment of a crosstalk response in a CWDM system for various carrier frequencies and using light with wavelengths in the range of 1470 to 1610 nm (18 wavelength system, 3 dBm, 30 Km).

FIG. 10 is an illustration of an embodiment of a crosstalk response in a CWDM system for various carrier frequencies and using light with wavelengths in the range of 1470 to 1610 nm (18 wavelength system, 3 dBm, 30 Km).

Figure 11:
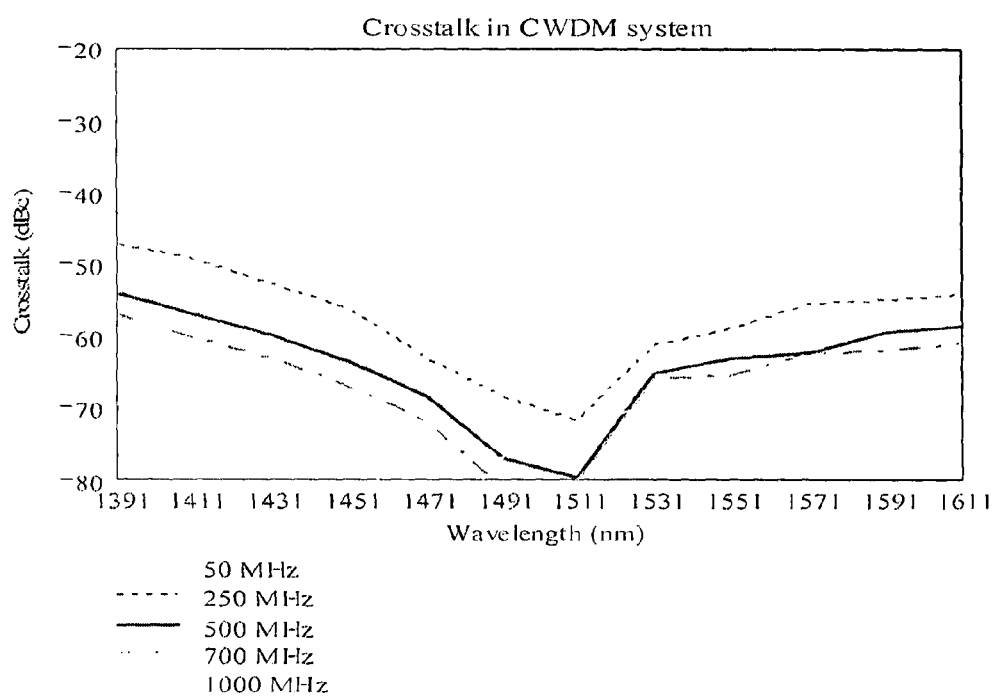
FIG. 11 is an illustration of an embodiment of a crosstalk response in a CWDM system for various carrier frequencies and using light with wavelengths in the range of 1391 to 1611 nm (12 wavelength system, 3 dBm, 30 Km).

FIG. 11 is an illustration of an embodiment of a crosstalk response in a CWDM system for various carrier frequencies and using light with wavelengths in the range of 1391 to 1611 nm (12 wavelength system, 3 dBm, 30 Km).

Figure 12:
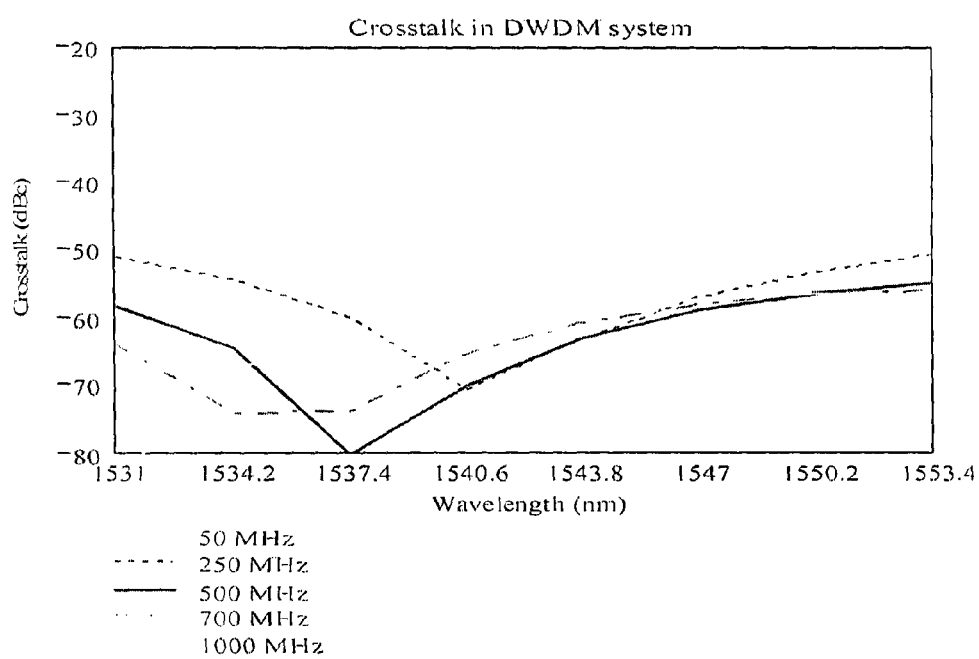
FIG. 12 is an illustration of an embodiment of a crosstalk response in a DWDM system for various carrier frequencies and using light with wavelengths in the range of 1531 to 1553.4 nm (8 wavelength system, 3.2 nm band spacing, 3 dBm, 30 Km).

FIG. 12 is an illustration of an embodiment of a crosstalk response in a DWDM system for various carrier frequencies and using light with wavelengths in the range of 1531 to 1553.4 nm (8 wavelength system, 3.2 nm band spacing, 3 dBm, 30 Km).

Figure 13:
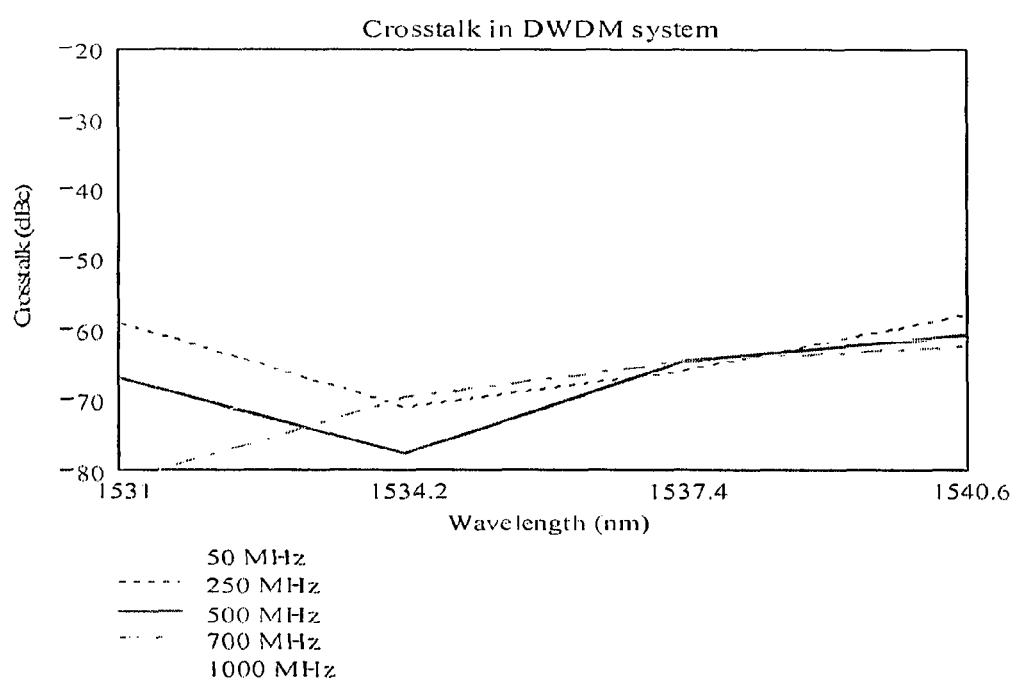
FIG. 13 is an illustration of an embodiment of a crosstalk response in a DWDM system for various carrier frequencies and using light with wavelengths in the range of 1531 to 1540.6 nm (4 wavelength system, 3.2 mm band spacing, 3 dBm, 30 Km).

FIG. 13 is an illustration of an embodiment of a crosstalk response in a DWDM system for various carrier frequencies and using light with wavelengths in the range of 1531 to 1540.6 nm (4 wavelength system, 3.2 nm band spacing, 3 dBm, 30 Km).

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. An optical to electrical converter for separating broadcast and narrowcast signals in accordance with a radio frequency (RF) ratio, the converter comprising:
   a splitter separating one or more narrowcast signals from a broadcast signal;
   at least one broadcast signal path receiving the broadcast signal separated from one or more narrowcast signals;
   at least one narrowcast signal path receiving a narrowcast signal separated from the broadcast signal;
   the narrowcast path comprising an attenuator for attenuating the separated narrowcast signal; and
   a controller coupled to the at least one broadcast signal path and the at least one narrowcast signal path, the controller maintaining a separation between the broadcast and the narrowcast signals in accordance with the RF ratio value by:

monitoring optical monitor voltage (OMV) for at least one broadcast signal receiver in the at least one broadcast signal path;

monitoring optical monitor voltage (OMV) for at least one narrowcast receiver in the at least one narrowcast signal path;

dynamically determining settings for a respective narrowcast receiver's attenuator based on the at least one broadcast receiver OMV and the at least one narrowcast receiver OMV; and providing a control signal to the at least narrowcast receiver, the control signal identifying the adjusted attenuator settings for maintaining a separation between the broadcast and narrowcast signals in accordance with the RF ratio.

2. The optical to electrical converter of claim 1, wherein the controller remotely receives and applies changes to a high-pass cutoff frequency of the narrowcast filter.

3. The optical to electrical converter of claim 1, wherein the controller comprises logic to dynamically monitor and adjust the attenuator to maintain separation between the broadcast and narrowcast signals.

4. The optical to electrical converter of claim 1, wherein the controller is further configured to monitor optical modulation index (OMI) for a broadcast signal transmitter, and OMI for at least one narrowcast transmitter, and to apply the broadcast transmitter OMI and narrowcast transmitter OMI to determine settings for the attenuator.

5. The optical to electrical converter of claim 1, wherein the controller is further configured to remotely receive and apply changes to a low-pass cutoff frequency of a low-pass filter of the broadcast receiver.

6. The optical to electrical converter of claim 1, wherein the controller is further configured to dynamically adjust the gain of one or both of the broadcast and narrowcast receivers.

7. The optical to electrical converter of claim 1, further comprising a low-pass filter in the at least one broadcast signal path.

8. The method of claim 1, further comprising dynamically adjusting the gain of one or both of the broadcast and narrowcast receivers.

9. A method for separating broadcast and narrowcast signals in accordance with a radio frequency (RF) ratio, the method comprising:

separating one or more narrowcast signals from a broadcast signal;

applying a first attenuation to a separated narrowcast signal;

monitoring optical monitor voltage of the broadcast signal;

monitoring optical monitor voltage for the one or more narrowcast signals;

determining settings for attenuation of the one or more narrowcast signals based on the broadcast receiver OMV and the narrowcast receiver OVM;

dynamically adjusting the attenuation settings to maintain a separation between the broadcast and narrowcast signals in accordance with the RF ratio; and applying the adjusted attenuation for attenuation of the separated narrowcast signal.

10. The method of claim 9, further comprising monitoring optical modulation index (OMI) for a broadcast signal transmitter and OMI for at least one narrowcast transmitter, and applying the broadcast transmitter OMI and narrowcast transmitter OMI to determine settings for attenuation.

11. The method claim 9, further comprising receiving and applying changes to a low-pass cutoff frequency of a low-pass filter of the broadcast receiver.

* * * * *